United States Patent [19]

Maucher

[11] Patent Number: 4,738,343

[45] Date of Patent: Apr. 19, 1988

[54] FRICTION CLUTCH AND ACTUATOR THEREFOR

[75] Inventor: Paul Maucher, Sasbach, Fed. Rep. of Germany

[73] Assignee: Luk Lamellen Und Kupplungsbau GmbH, Bühl, Fed. Rep. of Germany

[21] Appl. No.: 807,288

[22] Filed: Dec. 10, 1985

[30] Foreign Application Priority Data

Dec. 24, 1984 [DE] Fed. Rep. of Germany ....... 3447324

[51] Int. Cl.$^4$ ............................................. F16D 13/71
[52] U.S. Cl. ................................. 192/70.13; 192/89 B
[58] Field of Search ............... 192/89 B, 70.13, 70.27, 192/70.28, 98, 109 A, 110 S; 403/348, 349

[56] References Cited

U.S. PATENT DOCUMENTS

| | | | |
|---|---|---|---|
| 4,228,882 | 10/1980 | Huber et al. ........................... | 192/98 |
| 4,502,583 | 3/1985 | Limbacher ........................ | 192/70.13 |
| 4,565,271 | 1/1986 | Lassiaz ............................... | 192/89 B |
| 4,597,485 | 7/1986 | Braun ................................ | 192/89 B |

Primary Examiner—Carl D. Friedman
Attorney, Agent, or Firm—Peter K. Kontler

[57] ABSTRACT

A pull-type friction clutch has a diaphragm spring with radially inwardly extending prongs which are separably coupled to an axially movable actuator by a bayonet mount so that the prongs are compelled to share axial movements of the actuator in either direction. The actuator can be shifted axially by a bearing which is separably secured thereto by a coupling in such a way that the coupling is activated in automatic response to movement of the actuator toward the change-speed transmission in a motor vehicle. A tool can be used to change the angular position of the actuator with reference to the diaphragm spring whereby the bayonet mount is activated or deactivated, depending upon whether the operator wishes to establish or terminate a connection between the transmission and the engine of a motor vehicle.

26 Claims, 4 Drawing Sheets

FRICTION CLUTCH AND ACTUATOR THEREFOR

BACKGROUND OF THE INVENTION

The present invention relates to motor vehicles and other machines or assemblies which employ friction clutches. More particularly, the invention relates to improvements in means for operating friction clutches in motor vehicles and in the manner of assembling the operating means with friction clutches.

A friction clutch normally comprises a support (e.g., a housing or cover) which is provided with or carries a seat for a diaphragm spring serving to bias a pressure plate against a clutch plate so that the latter can be urged against the flywheel on the crankshaft of an internal combustion engine to drive the input shaft of a change-speed transmission when the engine is on. The means for engaging or disengaging the clutch normally comprises an actuator which engages the innermost portions of radially inwardly extending prongs forming part of the diaphragm spring. A pull-type friction clutch is constructed in such a way that the pressure plate engages the diaphragm spring radially inwardly of the seat on the support. In such friction clutches, the actuator must be connected with the innermost portions of the prongs so that it can move the end portions axially of the diaphragm spring in a first direction to engage the clutch as well as in a second direction (counter to the first direction) in order to release the clutch.

A drawback of presently known pull-type friction clutches for use in motor vehicles is that their installation in and their removal from the power train between the crankshaft of an internal combustion engine and the input shaft of the change-speed transmission constitute tedious and time-consuming operations. As a rule, the actuator is secured to the diaphragm spring before the clutch is operatively connected with the input shaft of the transmission, and the means for moving the actuator axially of the diaphragm spring is assembled with the transmission before the latter is connected with the output element (such as a clutch plate) of the clutch.

OBJECTS AND SUMMARY OF THE INVENTION

An object of the invention is to provide a novel and improved pull-type friction clutch which can be readily installed in and removed from the power train between an engine and a transmission.

Another object of the invention is to provide a novel and improved coupling between an actuator and the diaphragm spring of a pull-type friction clutch.

A further object of the invention is to provide novel and improved means for operating a pull-type friction clutch.

An additional object of the invention is to provide a novel and improved method of assembling an internal combustion engine with and of separating the engine from a change-speed transmission.

Still another object of the invention is to provide a novel and improved tool for use in the practice of the above outlined method.

A further object of the invention is to provide a novel and improved combination of a pull-type friction clutch and an actuator which can deform the diaphragm spring of the clutch.

Another object of the invention is to provide a motor vehicle which embodies the above outlined friction clutch.

An additional object of the invention is to provide a novel and improved release assembly for transmitting motion to the actuator for the diaphragm spring of a pull-type friction clutch.

Another object of the invention is to provide a novel and improved diaphragm spring for use in the above outlined clutch.

A further object of the invention is to provide a novel and improved actuator which can be used to change the conicity of the diaphragm spring in a friction clutch.

Another object of the invention is to provide a simple, compact and inexpensive unit for operating a pull-type friction clutch.

One of several features of the present invention resides in the provision of a friction clutch which comprises a diaphragm spring having a first side and a second side and including a plurality of substantially radially inwardly extending prongs and slots which alternate with the prongs, a pressure plate which is adjacent to the first side of the spring, a support having a seat adjacent to the other side of the spring, and means for pivoting the spring relative to the seat. The pivoting means includes an actuator which comprises a plurality of arms at least partially overlapping at least some of the prongs, as considered in the radial direction of the spring. The actuator can be turned relative to the spring (or vice versa) between a first angular position in which each of its arms registers with one of the slots so that the spring and the actuator can be moved axially relative to each other, and a second angular position in which each arm at least partially overlies one of the prongs, as considered in the axial direction of the spring.

The clutch can further comprise a housing which includes the support. The pressure plate is rotatable in a predetermined plane, and at least a portion of the actuator is preferably located in a second plane which is at least substantially parallel to the first plane.

When in the first angular position, the actuator is movable axially of the diaphragm spring between a first axial position in which selected arms are disposed at one side of the spring and a second axial position in which the selected arms are disposed at the other side of the spring and overlie the adjacent prongs in response to movement of the actuator to its second angular position so that the prongs which overlie the selected arms are compelled to share the axial movement of the actuator toward the first axial position. The actuator is preferably resilient and is prestressed in the second angular position. The arms of the actuator include at least two retaining portions (e.g., in the form of lugs) each of which engages at least one of the prongs at the one side of the spring in the second angular position of the actuator.

Some of the prongs include holding portions which engage the retaining portions or arms of the actuator in the second angular position of the actuator so that such prongs are compelled to share the axial movements of the actuator in either direction.

The prongs are preferably configured in such a way that they form a first group whose prongs overlie certain arms of the actuator at one side of the spring (in the second angular position of the actuator), and a second group whose prongs overlie the remaining arms of the actuator at the other side of the spring in the second angular position of the actuator. The prongs of the second group are preferably axially offset with reference to the prongs of the first group. Alternatively, or in addition to the just discussed feature, the actuator can comprise a portion which is axially offset with reference to at least some of its arms.

The prongs of the diaphragm spring are resilient and, as already mentioned above, are preferably assembled into a first group whose prongs overlie certain arms of the actuator in the second angular position of the actuator and a second group whose prongs then overlie the remaining prongs of the actuator. The resiliency of prongs which constitute the second group is preferably greater than the resiliency of prongs which constitute the first group. This can be readily achieved in a number of ways, preferably by making the prongs of the first group wider than the prongs of the second group (as considered in the circumferential direction of the diaphragm spring) and/or by dimensioning the prongs in such a way that the cross-sectional areas of prongs forming the second group are smaller than the cross-sectional areas of prongs which form the first group.

The clutch preferably comprises a bayonet mount which releasably couples the actuator to the diaphragm spring in the second angular position of the actuator. Such bayonet mount includes a first section which is provided on the spring and includes some or all of the prongs, and a second section which is provided on the actuator and includes at least some of the arms. The second section of the bayonet mount engages the first section in response to angular movement of the actuator with reference to the spring in a predetermined direction (e.g., clockwise), and the second section of the bayonet mount becomes disengaged from the first section in response to angular movement of the actuator in a second direction counter to the first direction.

The clutch preferably further comprises detent means for releasably holding the actuator in the second angular position. Such detent means can comprise a first portion which is provided on at least one of the prongs and a second portion which is provided on at least one of the arms. One portion of the detent means (preferably the second portion) can be formed with one or more sockets, and the other portion of the detent means preferably comprises one or more male latching elements which extend into the respective sockets in the second angular position of the actuator.

A second feature of the present invention resides in the provision of a motor vehicle which comprises a friction clutch and operating means for engaging and disengaging the clutch. The operating means includes a first actuator (preferably the aforediscussed actuator), a second actuator (e.g., including a release member, such as the customary fork), first coupling means (preferably the aforediscussed bayonet mount) which is activatable to releasably connect the clutch with the first actuator, and second coupling means which is activatable to releasably connect the first actuator with the second actuator. The first coupling means can releasably secure the first actuator to the clutch in the aforedescribed manner, i.e., by separably securing the arms of such first actuator to the prongs of the diaphragm spring in the clutch.

The clutch further comprises coaxial rotary input and output elements. The input element can include a flywheel or a pressure plate which is driven by the engine of the motor vehicle, and the output element can constitute a conventional clutch disc which is driven by the pressure plate and/or by the flywheel when the clutch is engaged. The motor vehicle further comprises an engine which drives the input element (e.g., by way of a customary crankshaft) and a transmission which receives torque from the output element when the clutch is engaged. The second actuator includes a portion (e.g., a sleeve) which is mounted on the transmission so that the second actuator and the transmission can be separated from the output element in response to deactivation of the second coupling means. The latter preferably comprises a first portion on the second actuator and a second portion which is provided on the first actuator and serves to automatically engage the first portion of the second coupling means in response to attachment of the transmission to the output element. Such motor vehicle further comprises means for securing the clutch to the engine (e.g., by securing the flywheel to the crankshaft of the engine) so that the first actuator and the clutch are automatically separated from the transmission when the transmission is separated from the output element of the clutch while the first coupling means is activated to secure the first actuator to the diaphragm spring.

The first and second coupling means preferably constitute two discrete entities. Thus, the first and second coupling means can be disposed at different radial distances from the common axis of the input and output elements of the clutch. Furthermore, the first coupling means can comprise a first group of components (such as the aforediscussed lugs, arms and prongs), and the second coupling means can comprise a discrete second group of components (such components can include the aforementioned sleeve of the second actuating means and a split wire ring which is carried by the first actuator and can snap into a circumferential groove of the sleeve).

A third feature of the invention resides in the provision of a friction clutch which comprises a rotary pressure plate, a diaphragm spring which is adjacent to the pressure plate, and means for pivoting (i.e., for changing the conicity of) the diaphragm spring relative to the pressure plate. The pivoting means includes a substantially disc-shaped actuator (preferably constituting the aforediscussed first actuator) having a centrally located opening, means (such as the aforementioned bayonet mount) for connecting the actuator to the diaphragm spring, release means (such release means can include a bearing and a fork which serves to move the bearing axially of the diaphragm spring), and means for releasably coupling the actuator to the release means (such coupling means can include or constitute the second coupling means of the aforediscussed motor vehicle). The coupling means includes a portion which is provided on the actuator, and such portion of the coupling means can include a radially expandable and contractible annular member in the form of a split wire ring which tends to contract radially and to remain in an external annular groove of the bearing.

An additional feature of the invention resides in the provision of a method of separating an engine from a transmission, particularly in a motor vehicle wherein the engine transmits to the transmission torque by way of a friction clutch having a diaphragm spring with substantially radially extending prongs and being engageable and disengageable by an actuator which can deform the spring by way of the prongs and is movable axially of the diaphragm spring by a bearing which is mounted on the transmission and is movable axially of the diaphragm spring by way of a release member in the form of a fork or the like. The method comprises the steps of establishing between the actuator and the prongs a bayonet mount which allows for separation of the actuator, together with the bearing, release member and transmission, from the diaphragm spring in response to angular movement of the diaphragm spring relative to the actuator and/or vice versa. Such method preferably further comprises the steps of affixing the clutch to the engine, confining the clutch in a suitable housing, and providing the housing with an opening (e.g., in the form of a window) for insertion of a tool which is utilized to move the actuator angularly with reference to the diaphragm spring. Such method preferably further comprises the step of providing the tool and the actuator with separable complementary torque transmitting components.

Still another feature of the invention resides in the provision of a tool for changing the angular position of an actuator (preferably the aforediscussed substantially disc-shaped (first) actuator) with reference to the diaphragm spring of a friction clutch wherein the actuator is movable axially of the diaphragm spring by a reciprocable bearing assembly. The tool comprises a support (e.g., in the form of an elongated handle) having an end portion, and an arcuate carrier mounted on or integral with the end portion of the support and being movable to and from an operative position in which it surrounds a portion of the bearing assembly. The carrier is turnable relative to the bearing assembly through the medium of the support and the tool further comprises torque transmitting means provided on the carrier and arranged to engage the actuator in the operative position of the carrier so that the suppport can turn the actuator by way of the carrier when the latter is held in the operative position.

A further feature of the invention resides in the provision of a combination of a friction clutch with a tool, such as the aforediscussed torque transmitting tool. The clutch comprises a rotary diaphragm spring having a plurality of substantially radially extending prongs, a substantially disc-shaped actuator for moving the prongs axially of the spring, and means for separably coupling the actuator to the prongs so that the actuator is separable from the prongs in response to its angular displacement with reference to the diaphragm spring and/or vice versa. The actuator is provided with a plurality of sockets which are angularly offset relative to each other, as considered in the circumferential direction of the diaphragm spring, and the tool serves to move the actuator angularly with reference to the diaphragm spring. Such tool comprises a carrier, a plurality of male torque transmitting elements provided on the carrier and being receivable in and extractible from the sockets in response to movement of the carrier axially of the diaphragm spring, and means (such as the aforementioned handle) for moving the carrier angularly about the axis of the diaphragm spring while the torque transmitting elements extend into their sockets.

The sockets can constitute circular or otherwise configurated openings or holes in the actuator, and the torque transmitting elements can comprise or constitute pins each of which has a tapering free end portion for convenient insertion into the respective socket. The tapering end portions of the pins can constitute or resemble cones. The carrier is preferably provided with at least one abutment or stop which lies against the actuator and/or against the diaphragm spring when the torque transmitting elements are properly received in their sockets.

The friction clutch can further comprise an annular bearing for the actuator, and the carrier preferably includes or constitutes an arcuate part which concentrically or nearly concentrically surrounds a portion of the bearing.

The novel features which are considered as characteristic of the invention are set forth in particular in the appended claims. The improved motor vehicle itself, however, both as to its construction and the mode of assembling or dismantling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
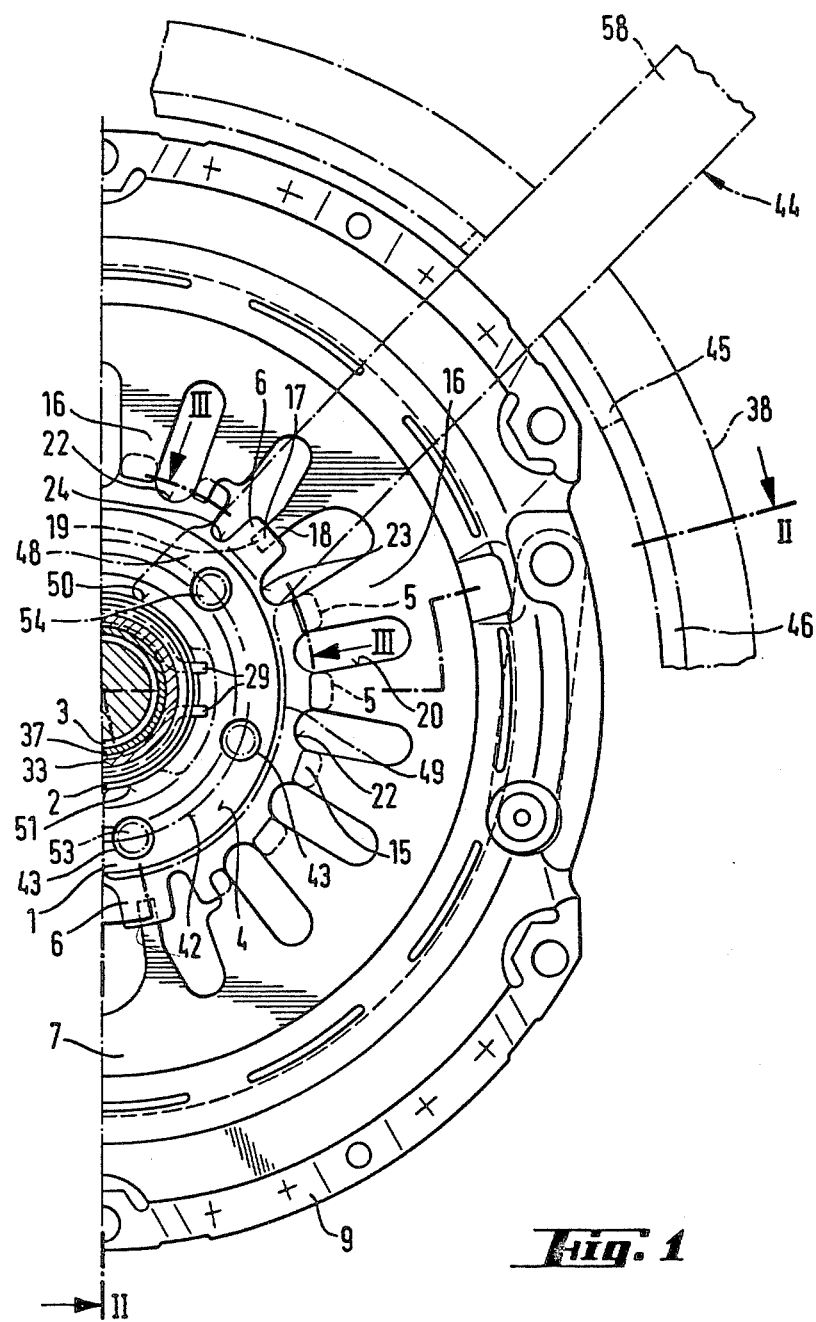
FIG. 1 is a fragmentary front elevational view of a friction clutch and of a substantially disc-shaped actuator which is configurated and coupled to the diaphragm spring of the clutch in accordance with the present invention, the view of FIG. 1 being taken in the direction of arrow X in FIG. 2.
Figure 2:
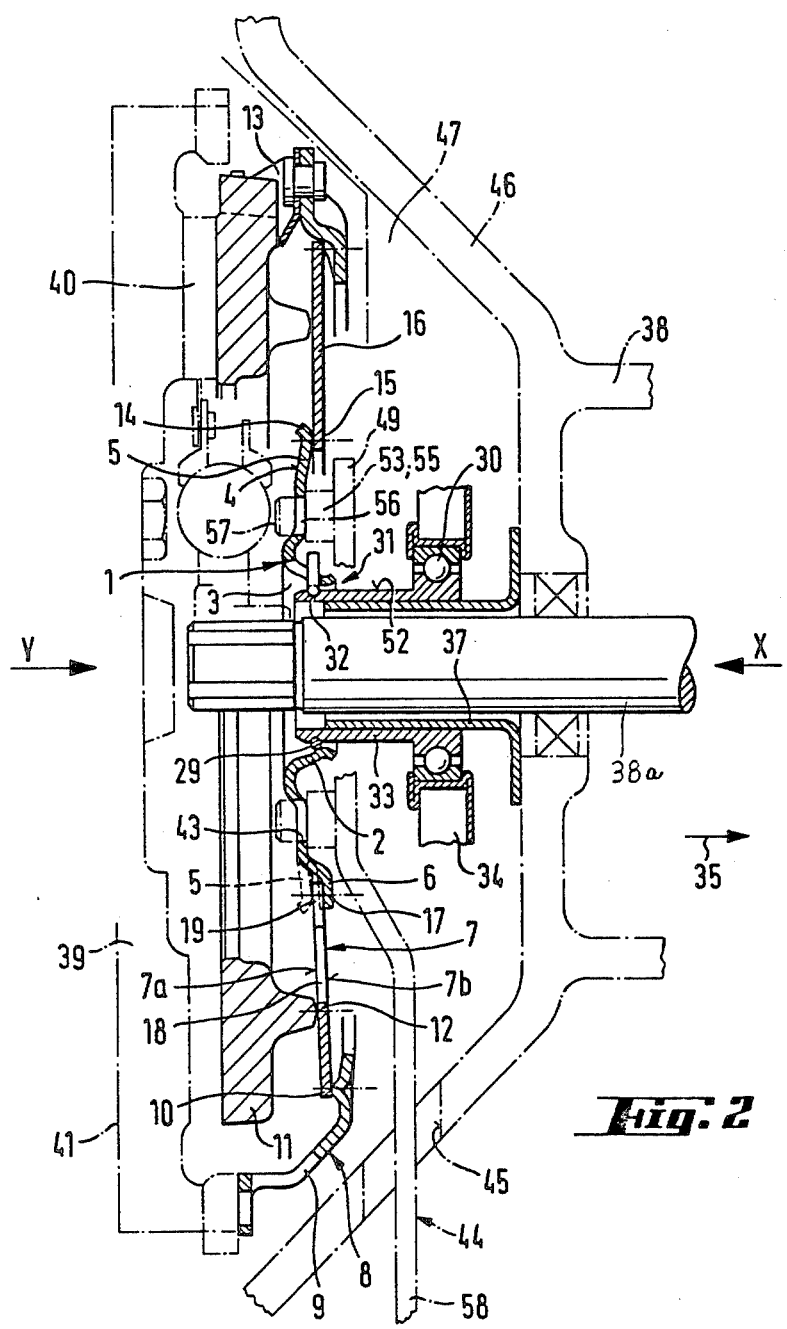
FIG. 2 is a sectional view as seen in the direction of arrows from the line II—II of FIG. 1.

FIGS. 1 and 2 show a portion of a motor vehicle which comprises an engine 39 including a flywheel 41 serving to connect the engine with the input element (pressure plate 11) of a friction clutch 8. The output element 40 of the clutch 8 is a clutch disc which can transmit torque to the input shaft 38a of a change-speed transmission 38.

The conicity of a diaphragm spring 7 which forms part of the friction clutch 8 can be changed by a substantially disc-shaped actuator 1. The latter is formed with a centrally located opening 3 which is surrounded by a hollow frustoconical portion 2 disposed radially inwardly of a substantially washer-like and substantially flat portion 4 whose plane is parallel to the planes of rotation of the pressure plate 11 and clutch plate 40. The portion 4 is surrounded by an annulus of substantially radially outwardly extending arms 5 and 6. The actuator 1 is formed with a group of fifteen arms 5 which are assembled into three sets of five arms each and each set of five arms 5 alternates with an arm 6. Each of the arms 5, 6 resembles a lug, and the arms 6 are disposed in a plane which is offset with reference to the plane of the arms 5, as considered in the axial direction of the diaphragm spring 7 (see FIG. 2).

The friction clutch 8 is a so-called pull-type clutch, i.e., the pressure plate 11 will be permitted to move axially and away from the flywheel 41 (in order to interrupt the transmission of torque to the clutch plate 40) when the tips of the radially inwardly extending prongs 16 and 18 of the diaphragm spring 7 are pulled in a direction to the right (note the arrow 35 in FIG. 2). At such time, the radially outermost circumferentially complete marginal portion 10 of the diaphragm spring 7 pivots relative to a seat at the inner side of a cover forming part of a support or housing 9 of the friction clutch 8. The diaphragm spring 7 is installed between the seat on the support 9 and the pressure plate 11 and normally urges the latter against the clutch plate 40 so that the clutch plate, in turn, is biased against the flywheel 41 on the crankshaft of the engine 39. The pressure plate 11 is axially movably but non-rotatably coupled to the support 9 by a set of leaf springs 13 and shares all angular movements of the flywheel 41. The reference character 12 denotes that portion of the diaphragm spring 7 which engages the pressure plate 11 radially inwardly of the marginal portion 10. The spring 7 is installed in prestressed condition.

Figure 4:
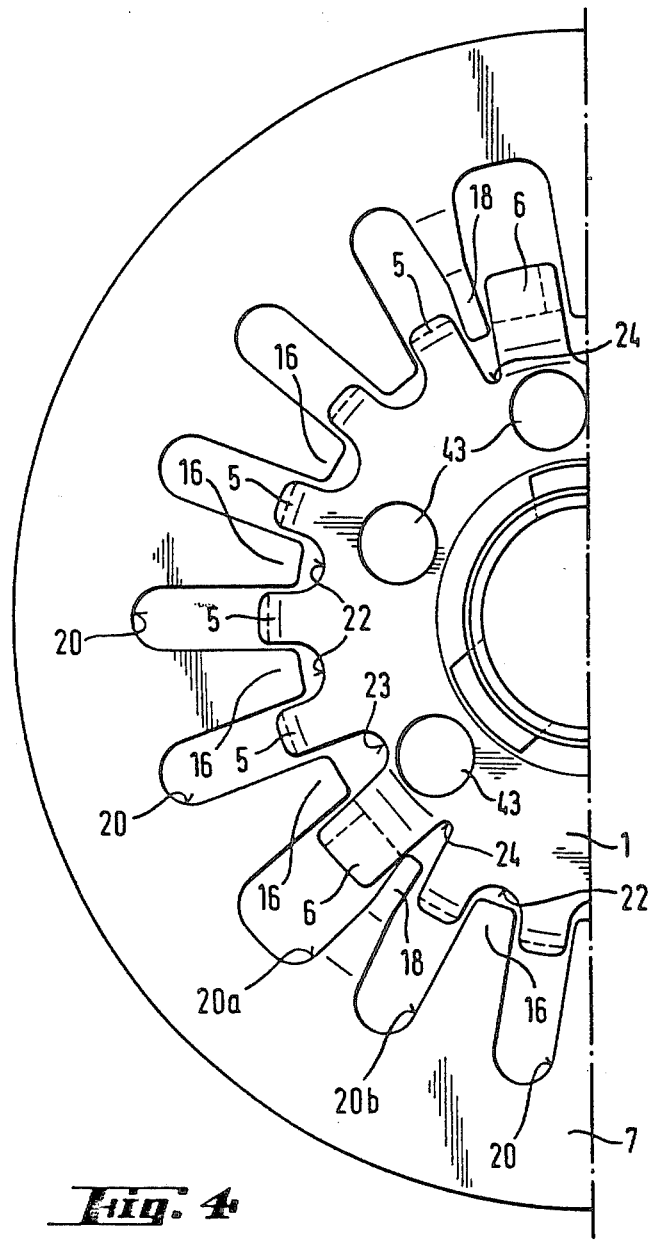
FIG. 4 is an enlarged view of a detail of the structure of FIG. 1, showing the actuator in its first angular position in which the diaphragm spring and the actuator are movable axially relative to each other.

The arms 5 of the actuator 1 have convex surfaces 14 which are in contact with the respective side 7a of the diaphragm spring 7 when the actuator 1 is held in the (second) angular position of FIGS. 1 and 2. The other (first) angular position of the actuator 1 with reference to the diaphragm spring 7 is shown in FIG. 4. The convex surfaces 14 of the arms 5 bear against the radially innermost portions 15 of radially inwardly extending prongs 16 forming part of the diaphragm spring 7. The latter further comprises three narrower prongs 18 (two shown in FIG. 4) and the arms 5, 6 overlap the prongs 16, 18, as considered in the radial direction of the diaphragm spring 7. The arms 6 of the actuator 1 have surfaces 17 which are disposed at or close to their radially outermost ends and contact the other side 7b of the diaphragm spring 7 when the parts 1 and 7 are properly coupled to each other in a manner as shown in FIGS. 1 and 2 so that the prongs 16, 18 of the diaphragm spring are compelled to share axial movements of the actuator in either direction (i.e., in the direction of the arrow X or 35 shown in FIG. 2). The side 7a of the diaphragm spring 7 faces toward, and the side 7b faces away from, the pressure plate 11. At least the narrower prongs 18 of the diaphragm spring 7 are prestressed so that they are elastically deformed and their portions 19 bear against the surfaces 17 of the respective arms 6. The number of prongs 18 matches the number of arms 6, and the number of prongs 16 matches the number of arms 5. When the parts 1 and 7 are properly coupled to each other, each arm 5 bears against one of the prongs 16 and each arm 6 bears against one of the prongs 18. The cross-sectional area of each prong 18 is smaller than the cross-sectional area of a prong 16, and the width of each prong 18 (as considered in the circumferential direction of the diaphragm spring 7) is less than that of a prong 16. This ensures that the resiliency of the prongs 18 exceeds that of the prongs 16.

The prongs 16, 18 can be said to constitute one section and the arms 5, 6 can be said to constitute another section of a bayonet mount which separably couples the actuator 1 to the diaphragm spring 7 but allows for ready separation of the parts 1 and 7 from each other in response to turning of the actuator 1 relative to the diaphragm spring 7 and/or vice versa from the angular position of FIG. 1 to the angular position of FIG. 4.

Figure 3:
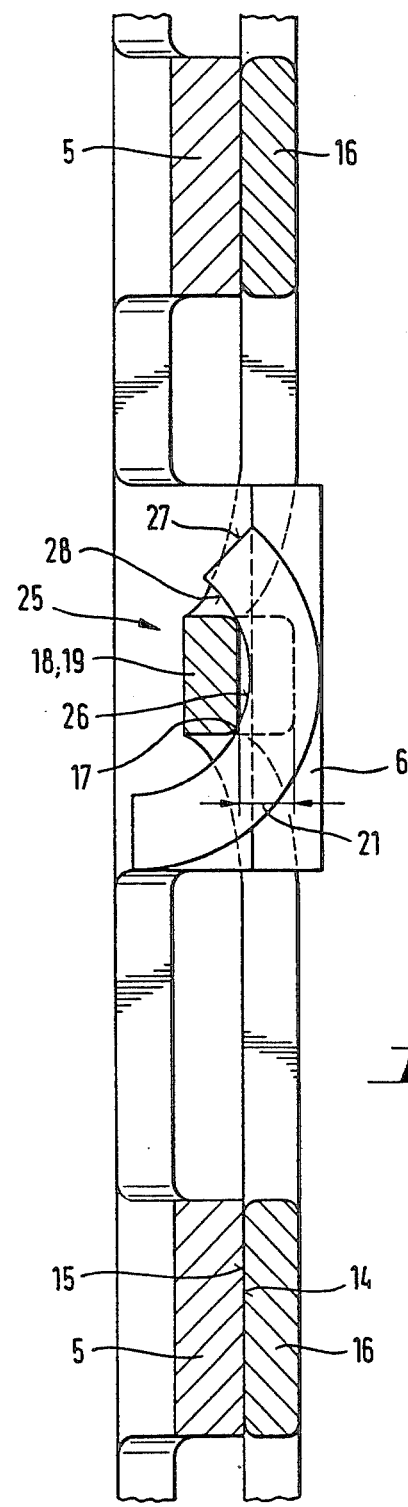
FIG. 3 is an enlarged fragmentary sectional view as seen in the direction of arrows from the arcuate line III—III of FIG. 1.

FIG. 3 shows by broken lines the position of one of the narrower prongs 18 when the parts 1 and 7 are disconnected from each other, i.e., when the actuator is movable axially of the diaphragm spring. The reference character 21 denotes in FIG. 3 the extent to which the free end portion 19 of the prong 18 is deformed in response to engagement of the bayonet mount, i.e., in response to movement of the actuator 1 from the first angular position of FIG. 4 to the second angular position of FIG. 1. The prongs 18 are then deformed and bear against the adjacent sides of the corresponding arms 6.

The neighboring prongs 16, 18 of the diaphragm spring 7 are separated from each other by radially extending slots 20 (see particularly FIG. 4). These slots include relatively wide slots 20a which are designed to permit axial passage of the relatively wide arms 6, and narrower slots 20b each of which is adjacent to one of the wider slots 20a. The width of each slot 20 suffices to permit the passage of an arm 5, and the angular distances between the wider slots 20a (such distances equal 120 degrees) are the same as those between the arms 6. When the parts 1 and 7 are held in the angular positions of FIG. 4, the actuator 1 can be moved axially in a first direction (note the arrow X in FIG. 2) so as to move the arms 5 through the respective slots 20, 20b (i.e., the arms 5 are moved from the side 7b to the side 7a of the diaphragm spring 7) and to move the arms 6 into the plane of the prongs 16, 18. The actuator 1 is then turned relative to the diaphragm spring 7 and/or vice versa so that the arms 5 engage the adjacent prongs 16 at the side 7a and the arms 6 engage the adjacent prongs 18 at the side 7b of the diaphragm spring. This completes the coupling operation, i.e., the bayonet mount between the parts 1 and 7 is activated and the radially innermost portion of the spring 7 is then compelled to share the axial movements of the actuator 1 for the purpose of engaging or disengaging the clutch 8.

The clearances or slots 22 between the neighboring arms 5 are relatively shallow. Each arm 6 is flanked by two deeper slots 23 and 24. The slots 23 are wider than the slots 24 so that each slot 23 can permit the passage of a wider prong 16 and each slot 24 can permit the passage of a narrower prong 18.

The diaphragm spring 7 and the actuator 1 are further provided with detent means 25 in order to prevent accidental deactivation of the bayonet mount, e.g., in response to vibration of the friction clutch 8. The detent means 25 comprises a first portion on the tips of the arms 6 and a second portion on the tips of the prongs 18. This can be readily seen in FIG. 3 wherein the free end portion or holding portion (or latching element) 19 of the prong 18 shown therein is received in a socket 26 of the respective arm 6. The detent means 25 prevents accidental angular displacement of the diaphragm spring 7 relative to the actuator 1 and/or vice versa. Each socket 26 is bounded by a preferably concave surface, one end portion 28 of which (as considered in the circumferential direction of the actuator 1) is adjacent to a suitably inclined cam face 27 which enables the holding portion 19 of the respective narrower prong 18 to ride onto the end portion 28 and to thereupon enter the central portion of the respective socket 26 in order to reliably hold the actuator 1 in a predetermined angular position with reference to the diaphragm spring 7. The provision of cam faces 27 on the arms 6 renders it possible to cause the holding portions 19 of the prongs 18 to penetrate into the respective sockets 26 with the exertion of a relatively small effort, and the same holds true for the end portions 28 which also constitute cam faces and serve to ensure that the parts 1 and 7 can be turned relative to each other (preparatory to separation of the actuator from the diaphragm spring) with the exertion of a relatively small effort which should suffice, however, to prevent accidental detachment of the actuator from the friction clutch 8 including the spring 7.

The configuration of the parts of the bayonet mount including the prongs 16, 18 and the arms 5, 6 and the configuration of the slots 20, 20a, 20b, 22, 23 and 24 are such that the angular movement of the actuator 1 from the first angular position of FIG. 4 to the second angular position of FIG. 1 takes place counter to the direction in which the engine 39 drives the flywheel 41 and hence the pressure plate 11 and the diaphragm spring 7.

The means for operating the friction clutch 8 further comprises a second actuator including an antifriction bearing 30 and a fork-shaped release member 34 which is mounted on the housing of the transmission 38 and serves to shift the bearing 30 axially of the input shaft 38a and to thereby move the actuator 1 axially of the diaphragm spring 7. The aforediscussed bayonet mount constitutes a first coupling which is activatable to separably connect the actuator 1 to the diaphragm spring 7, and the motor vehicle embodying the illustrated structure further comprises a second coupling 31 which serves to separably connect the bearing 30 with the actuator 1. To this end, the coupling 31 comprises a first portion which is provided on the frustoconical portion 2 of the actuator 1 and includes a radially expandible and contractible annular element in the form of a split wire ring 29, and a tubular second portion 33 which is connected to or is integral with the bearing 30 and has a circumferentially extending internal annular groove 32 for the ring 29. When the coupling 31 is activated, i.e., when the actuator 1 and the actuator 30, 34 are held in the mutual axial positions of FIG. 2, the ring 29 is held in the groove 32 and thereby ensures that the actuator 1 shares all axial movements of the bearing 30. In other words, if the coupling 31 is to be deactivated, the person in charge must exert a force which suffices to cause a radial expansion of the ring 29 and its expulsion from the internal groove 32 of the tubular portion 33. In normal operation, the coupling 31 holds the actuator 1 against axial movement relative to the tubular portion 33. It will be noted that the components 29, 32, 33 of the coupling 31 are separate from those (5, 6, 15, 18) of the coupling which constitutes the bayonet mount between the actuator 1 and the diaphragm spring 7. Furthermore, the locations of the two couplings are also different, i.e., the coupling including the bayonet mount is located radially outwardly of the coupling 31. The direction in which the fork-shaped release member 34 of the second actuator must move in order to shift the bearing 30 and the actuator 1 in a direction to disengage the friction clutch 8 is indicated by the arrow 35. The tubular portion 33 of the bearing 30 is slidable along a tubular guide 37 which is mounted in or forms part of the housing of the transmission 38.

In order to facilitate assembly of the parts which are shown in FIG. 2, the actuator 1 is preferably assembled with the diaphragm spring 7 by activating the bayonet mount 5, 6, 16, 18 in the aforedescribed manner. The actuator 1 can be coupled to the diaphragm spring 7 before or after the friction clutch 8 is mounted on the flywheel 41, i.e., on the crankshaft of the engine 39. The bearing 30 and the release member 34 are preferably assembled with the transmission 38 before the latter is secured to the clutch 8 by the coupling 31. The tubular portion 33 is then shifted axially in the direction of the arrow X in order to activate the coupling 31 by causing the split ring 29 to snap into the internal groove 32 of the tubular portion 33. At such time, the front end of the tubular portion 33 extends into the central opening 3 of the actuator 1. As a rule, the coupling 31 is engaged or activated subsequent to attachment of the transmission 38 to the engine 39 by means of bolts, screws or the like. The release member 34 is thereupon simply pivoted or otherwise moved in a direction to shift the bearing 30 in the direction of the arrow X and to cause penetration of the split ring 29 into the internal groove 32 of the tubular portion 33.

FIG. 1 shows that the portion 4 of the actuator 1 is provided with an annulus of sockets 43 in the form of openings or holes whose centers are located on a common circle 42. The neighboring sockets or holes 43 are equidistant from each other, as considered in the circumferential direction of the actuator 1. These holes constitute the female portion of a torque transmitting unit which serves to facilitate detachment of the actuator 1 from the diaphragm spring 7, and such torque transmitting unit further comprises a pair of suitably spaced-apart male torque transmitting elements 53 and 54 in the form of pins provided on an arcuate carrier 49 forming part of a specially designed tool 44. The latter renders it possible to separate the actuator 1, the bearing 30, the release member 34 and the transmission 38 from the engine 39 by the simple expedient of turning the actuator 1 from the angular position of FIG. 1 to the angular position of FIG. 4 whereupon the parts 1, 30, 34 and 38 can be shifted in the axial direction of the input and output elements 11, 40 of the clutch 8 (arrow Y or 35 in FIG. 2) as soon as the bolts or screws which normally secure the transmission 38 to the engine 39 are removed.

The tool 44 resembles a wrench and has an elongated support 58 in the from of a handle one end portion 48 of which is integrally or separably connected with the carrier 49 of the pins 53 and 54. The support 58 extends outwardly through an opening or window 45 which is provided in a bell-shaped casing or housing 46 for the transmission 38 and friction clutch 8. The housing 46 forms part of the means for separably connecting the transmission 38 to the engine 39. The length of the opening 45, as considered in the circumferential direction of the clutch 8, is sufficient to allow for the passage of the arcuate (substantially sickle- or half moon-shaped) carrier 49, i.e., the carrier can be inserted into or withdrawn from the space 47 which is defined by the housing 46 for the friction clutch 8. The carrier 49 has abutments or stops 50, 51 which are disposed at its ends (as considered in the circumferential direction of the tubular portion 33) and lie against the respective side of the actuator 1 when the carrier is moved to the operative position which is shown in FIG. 2 by phantom lines. The carrier 49 then surrounds a substantial portion of the external surface 52 of the tubular portion 33 and each of its pins 53 and 54 extends into one of the holes 43 in the portion 4 of the actuator 1. The angular distance between the centers of the pins 53 and 54 is 120 degrees, and the angular distance between the centers of two neighboring holes 43 is 60 degrees. The center of the arc on which the centers of the pins 53, 54 are located is on the axis of the tubular portion 33 when the tool 44 is held in the operative position of FIG. 2. Each of the pins 53, 54 has a larger-diameter portion 55 which cannot pass through a hole 43 and a smaller-diameter portion 56 which fits snugly into the selected hole 43. Each smaller-diameter portion 56 has a preferably conical end portion or tip 57 which facilitates the insertion of pins 53, 54 into the selected pair of holes 43. The shoulders between the portions 55, 56 serve as stops in that they determine the extent to which the pins 53 and 54 can penetrate into the respective holes 43.

In order to deactivate the coupling which constitutes the aforediscussed bayonet mount between the actuator 1 and the diaphragm spring 7, an operator introduces the tool 44 into the space 47 by causing the arcuate carrier 49 and a portion of the support 58 to pass through the opening 45 of the housing 46. The carrier 49 can be caused to slide along the external surface 52 of the tubular portion 33 of the bearing 30 in a direction toward the actuator 1 whereby the pins 53, 54 enter the registering holes 43 of the actuator 1. The conical tips 57 facilitate penetration of the pins 53, 54 into the selected holes 43, and such penetration is terminated when the larger-diameter portions 55 of the pins strike against the respective side of the actuator 1 as well as when the abutments 50, 51 come to lie against the respective side of the portion 4 of the actuator 1. The tool 44 can be used to hold the actuator 1 against rotation while the diaphragm spring 7 is turned in a direction to move its prongs 16, 18 into register with the corresponding slots 22, 23, 24 of the actuator 1 or vice versa. Some turning of the carrier 49 relative to the tubular portion 33 may be necessary in order to place the pins 53, 54 into accurate or substantial alignment with the selected holes 43. Once the arms 5, 6 register with the adjacent slots 20, 20a, 20b, the housing 46 can be shifted axially of the flywheel 41 in order to separate the actuator 1 from the diaphragm spring 7 and to thus separate the entire clutch operating means 1, 30, 34 and the transmission 38 from the engine 39. Such separation involves the movement of arms 5 axially of the friction clutch 8 from the side 7a toward and beyond the side 7b of the diaphragm spring 7 i.e., in the direction of the arrow Y in FIG. 2. Alternatively, the clutch 8 can be shifted axially in the direction of the arrow X while the actuator 1 is held against axial movement in the same direction.

FIG. 1 shows that one of the abutments 50, 51 is nearer to the end portion 48 of the support 58 than the other abutment, i.e., the end portion 48 is not disposed midway between the ends of the arcuate carrier 49. This often facilitates insertion of the carrier 49 into the space 47 by way of the opening 45 in the housing 46. Such asymmetrical mounting of the carrier 49 on the support 58 renders it possible to provide the housing 46 with a relatively small opening 45. However, it is equally within the purview of the invention to employ a tool wherein the end portion 48 of the support 58 is located exactly or substantially midway between the ends of the arcuate carrier. Furthermore, the carrier 49 can be longer so that its pins 53, 54 extend into a pair of holes which are disposed diametrically opposite each other or are spaced apart through an angle of, for example, 150 degrees.

An important advantage of the improved structure is that the actuator 1 can be coupled to or detached from the diaphragm spring 7 (i.e., the transmission 38 can be attached to or detached from the engine 39) in a simple and time-saving operation and by utilizing a simple and inexpensive tool. All that is necessary is to place the tips 14 of the arms 5 and 6 into register with the adjacent slots 20, 20a, 20b so that the actuator 1 can be moved axially of the diaphragm spring 7 (arrow 35) and/or vice versa. Reengagement is effected by moving the actuator 1 in the opposite direction (arrow X in FIG. 2). When the transmission 38 is to be detached from the engine 39, the actuator 1 preferably remains attached to the tubular portion 33 of the bearing 30 so that the entire operating means 1, 30, 34 for the clutch 8 can be separated from the engine 39 as a unit jointly with the transmission 38. On the other hand, the actuator 1 is preferably coupled to the diaphragm spring 7 before the parts 30, 34 of the operating means and the transmission 38 are attached or reattached to the engine 39. In the next step, the tubular portion 33 is moved axially along the guide 37 to enable the split ring 29 to snap into the groove 32 of the tubular portion 33 and to thus activate the coupling 31 between the (first actuator 1 and the (second) actuator including the bearing 30 and the release member 34. Activation of the coupling including the bayonet mount having the components 5, 6, 16 and 18 can take place by moving the clutch 8 axially toward the actuator 1 (while the arms 5, 6 register with the corresponding slots 20, 20a and 20b) and/or by moving the actuator 1 axially toward the diaphragm spring 7. Furthermore, the actuator 1 can be coupled to the friction clutch 8 before the latter is secured to the engine 39 by way of the flywheel 41. The detent means 25 prevents undesirable or accidental separation of the actuator 1 from the diaphragm spring 7. It will be seen that the actuator 1 can be coupled to the clutch 8 before or after the latter is attached to the engine 39. As mentioned above, the actuator 1 is at least slightly stressed when the coupling including the bayonet mount is activated; this also reduces the likelihood of accidental separation of the actuator 1 from the diaphragm spring 7.

An important advantage of the means 1, 30, 34 for operating the friction clutch 8 and of the aforedescribed manner of mounting the friction clutch in the power train between the engine 39 and the transmission 38 is that the transmission and the engine can be separated from each other in a very simple and time-saving manner. The same applies, practically to the same extent, for assembly or reassembly of the engine 39 with the transmission 38. It has been found that the improved bayonet mount constitutes a highly satisfactory coupling which ensures reliable transmission of axial motion from the release assembly 30, 34 to the actuator 1 and to the prongs 16, 18 of the diaphragm spring 7. The number of relatively wide arms 6 can be increased to four or more or reduced to two without departing from the spirit of the invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch comprising a diaphragm spring having a first side and a second side and including a plurality of substantially radially inwardly extending prongs and slots alternating with said prongs; a pressure plate adjacent to the first side of said spring; a support including a seat adjacent to the second side of said spring; and means for pivoting said spring relative to said seat including an actuator having a plurality of arms at least partially overlapping at least some of said prongs as considered in the radial direction of said spring, said actuator being turnable relative to said spring or vice versa between a first angular position in which each of said arms registers with one of said slots and a second angular position in which each of said arms at least partially overlies one of said prongs, as considered in the axial direction of said spring, to pivot the spring in response to axial movement of said actuator relative to said spring, said actuator being movable axially of said spring in said first angular position thereof between a first axial position in which selected arms are disposed at one side of said spring and a second axial position in which said selected arms are disposed at the other side of said spring and overlies the adjacent prongs in response to movement of said actuator to said second angular position whereby the prongs which overlies said selected arms are compelled to share the axial movements of said actuator toward said first axial position.

2. The clutch of claim 1, further comprising a housing which includes said support, said pressure plate being rotatable in a first plane and at least a portion of said actuator being disposed in a second plane which is substantially parallel to said first plane.

3. The clutch of claim 1, wherein at least some of said prongs are resilient and are prestressed in said second angular position of said actuator.

4. The clutch of claim 1, wherein selected arms of said actuator are adjacent to one side of said spring in the second angular position of said actuator and the arms of said actuator comprise at least two retaining arms each of which engages at least one of said prongs at the other side of said spring in the second angular position of said actuator.

5. The clutch of claim 4, wherein some of said prongs include holding portions which engage said retaining arms in the second angular position of said actuator so that such prongs are compelled to share the axial movements of said actuator in either direction.

6. The clutch of claim 1, wherein said arms include a first group whose arms overlie said prongs at one side of said spring in the second angular position of said actuator and a second group whose arms overlie said prongs at the other side of said spring in the second angular position of said actuator, the arms of said second group being axially offset with reference to the arms of said first group.

7. The clutch of claim 1, wherein said actuator comprises a portion which is axially offset with reference to at least some said arms.

8. The clutch of claim 1, wherein said prongs are resilient and include a first group whose prongs overlie some of said arms in the second angular position of said actuator and a second group whose prongs overlie additional arms in the second angular position of said actuator, the resiliency of prongs of one of said groups being greater than the resiliency of prongs of the other of said groups.

9. The clutch of claim 8, wherein the prongs of said one group are narrower than the prongs of said other group, as considered in the circumferential direction of said spring.

10. The clutch of claim 8, wherein the cross-sectional areas of the prongs of said one group are smaller than the cross-sectional areas of the prongs of said other group.

11. The clutch of claim 1, further comprising a bayonet mount which couples said actuator to said spring in the second angular position of said actuator, said bayonet mount comprising a first section provided on said spring and including at least some of said prongs and a second section provided on said actuator and including at least some of said arms.

12. The clutch of claim 11, wherein the second section of said bayonet mount is arranged to engage said first section in response to angular movement of said actuator with reference to said spring in a predetermined direction and to become disengaged from said first section in response to angular movement of said actuator in a second direction counter to said predetermined direction.

13. The clutch of claim 1, further comprising detent means for releasably holding said actuator in said second angular position.

14. The clutch of claim 13, wherein said detent means comprises a first portion provided on said prongs and a second portion provided on said arms.

15. The clutch of claim 14, wherein one portion of said detent means has at least one socket and the other portion of said detent means comprises a latching element extending into said socket in the second angular position of said actuator.

16. In a motor vehicle, the combination of a friction clutch and operating means for engaging and disengaging said clutch, said operating means including a first actuator, a second actuator, first coupling means activatable to releasably connect said clutch with said first actuator, and second coupling means activatable to releasably connect said first actuator with said second actuator, said first coupling means including a first portion provided on said clutch and a second portion provided on first actuator, said first portion comprising a diaphragm spring having a first side and a second side and including a plurality of substantially radially inwardly extending prongs and slots alternating with said prongs, said second portion comprising a plurality of arms at least partially overlapping at least some of said prongs as considered in the radial direction of said spring, said first actuator being turnable relative to said spring or vice versa between a first angular position in which each of said arms registers with one of said slots and a second angular position in which each of said arms at least partially overlies one of said prongs, as considered in the axial direction of said spring, to pivot said spring in response to axial movement of said first actuator relative to said spring, said first actuator being movable axially of said spring in said first angular position thereof between a first axial position in which selected arms are disposed at one side of said spring and a second axial position in which said selected arms are disposed at the other side of said spring and overlie the adjacent prongs in response to movement of said first actuator to said second angular position whereby the prongs which overlie said selected arms are compelled to share the axial movements of said first actuator toward said first axial position.

17. The structure of claim 16, wherein said second actuator comprises a release member.

18. The structure of claim 16, wherein said clutch comprises coaxial rotary input and output elements and further comprising an engine arranged to drive said input element and a transmission arranged to receive torque from said output element in engaged condition of said clutch, said second actuator including a portion which is mounted on said transmission so that said second actuator and said transmission can be separated from said output element in response to deactivation of said first coupling means.

19. The structure of claim 18, wherein said second coupling means comprises a first portion on said second actuator and a second portion provided on said first actuator and arranged to automatically engage said first portion in response to attachment of said transmission to said output element.

20. The structure of claim 19, further comprising means for securing said clutch to said engine so that said first actuator and said transmission are automatically separated from said clutch in response to separation of the transmission from said output element in activated condition of said second coupling means.

21. The structure of claim 18, wherein said first and second coupling means are disposed at different radial distances from the common axis of said input and output elements.

22. The structure of claim 16, wherein said first coupling means comprises a first group of components including said prongs and said arms, and said second coupling means comprises a discrete second group of components.

23. A friction clutch comprising a rotary clutch plate; a diaphragm spring adjacent to said plate; and means for pivoting said spring relative to said plate including a substantially disc-shaped actuator having a central opening, means for connecting said actuator to said spring, release means, and means for separably coupling said actuator to said release means, said coupling means including a portion provided on said actuator, said connecting means comprising a first portion provided on said spring and a second portion provided on said actuator, said first portion including a plurality of substantially radially inwardly extending prongs and slots provided in said spring and alternating with said prongs, said second portion including a plurality of arms at least partially overlapping at least some of said prongs as considered in the radial direction of said spring, said actuator being turnable relative to said spring or vice versa between a first angular position in which each of said arms registers with one of said slots and a second angular position in which each of said arms at least partially overlies one of said prongs, as considered in the axial direction of said spring, to pivot the spring in response to axial movement of said actuator relative to said spring, said actuator being movable axially of said spring in said first angular position thereof between a first axial position in which selected arms are disposed at one side of said spring and a second axial position in which said selected arms are disposed at the other side of said spring and overlie the adjacent prongs in response to movement of said first actuator to said second angular position whereby the prongs which overlie said selected arms are compelled to share the axial movements of said actuator toward said first axial position.

24. The clutch of claim 23, wherein said release means includes a bearing.

25. The clutch of claim 23, wherein said portion of said coupling means includes a radially expandible and contractible annular member.

26. The clutch of claim 25, wherein said annular member is a split wire ring.

* * * * *